UNITED STATES PATENT OFFICE.

JAMES S. VOSSELLER, OF PLAINFIELD, NEW JERSEY.

IMPROVEMENT IN COMPOUNDS FOR PAINT.

Specification forming part of Letters Patent No. 135,049, dated January 21, 1873.

*To all whom it may concern:*

Be it known that I, JAMES S. VOSSELLER, of Plainfield, Union county, State of New Jersey, have invented a certain Compound Pigment, of which the following is a specification:

This invention has for its object the production of a paint that may be formed of some very cheap elements, as water, and some of the comparatively inexpensive earths, with others that are well known as pigments, by which a thoroughly homogeneous compound is formed that will remain in combination in a sufficiently dilute state to serve as a valuable paint for a great variety of purposes.

The proportions and the qualities of the several elements may be considerably varied, according to the uses for which the paint is to be applied; but for a quantity of the compound something like the following may be used: Sixteen gallons of linseed-oil, either raw or boiled; thirteen gallons of water; two pounds of borate of manganese; one-half pound of glue; two hundred and forty pounds of pigment, as one-fourth lead and three-fourths zinc; or all of either, or mineral or earth paints, in combination with both the above or either, as the colors are desired to be varied.

The process of mixing is conveniently conducted by dissolving the half pound of glue in the thirteen gallons of water; then mix the two pounds of borate of manganese with the sixteen gallons of oil; then mix the glue-water with the oil, stirring thoroughly; then gradually add the pigments lead and zinc, or either, or the coloring earths or minerals, thoroughly incorporating them by grinding under a muller or in a mill or mixer, as most convenient.

To reduce, if found necessary, to a more easy-flowing liquid, either turpentine or benzine may be used, as is now done, especially after the paint has stood for some time and some of the elements have evaporated.

It is evident that the above proportions may be considerably varied; as the proportion of water is varied in the difference between raw oil or that which has been boiled, so also the proportions of the coloring earths or minerals with the lead or zinc; and therefore I do not wish to be limited to the exact proportions here given.

I do not broadly claim the employment of raw or boiled linseed-oil, water, and pigments in the manufacture of paints, for such is old and well-known; but

I claim—

A compound pigment or paint formed of the several elements and in substantially the proportions hereinbefore described.

JAS. S. VOSSELLER.

Witnesses:
   BOYD ELIOT,
   E. N. ELIOT.